(12) United States Patent
Wang et al.

(10) Patent No.: US 9,170,369 B2
(45) Date of Patent: Oct. 27, 2015

(54) GRADED REFRACTIVE INDEX BENDING-RESISTANT MULTIMODE OBTICAL FIBER

(71) Applicant: EverPro Technologies Company Ltd., Wuhan, Hubei (CN)

(72) Inventors: Song Wang, Hubei (CN); Zhipan Zhou, Hubei (CN); Yongtao Liu, Hubei (CN); Jin Xu, Hubei (CN); Mingfeng Fan, Hubei (CN); Shuqiang Zhang, Hubei (CN); Wei Wang, Hubei (CN)

(73) Assignee: EVERPRO TECHNOLOGIES COMPANY LTD., Wuhan, Hubei (CN)

( * ) Notice: Subject to any disclaimer, the term of this patent is extended or adjusted under 35 U.S.C. 154(b) by 0 days.

(21) Appl. No.: 14/548,047

(22) Filed: Nov. 19, 2014

(65) Prior Publication Data
US 2015/0117827 A1 Apr. 30, 2015

Related U.S. Application Data

(63) Continuation of application No. PCT/CN2013/074667, filed on Apr. 25, 2013.

(30) Foreign Application Priority Data

May 28, 2012 (CN) .......................... 2012 1 0167873

(51) Int. Cl.
G02B 6/02 (2006.01)
G02B 6/028 (2006.01)
G02B 6/036 (2006.01)

(52) U.S. Cl.
CPC .......... *G02B 6/0281* (2013.01); *G02B 6/03644* (2013.01)

(58) Field of Classification Search
CPC .......................... G02B 6/0281; G02B 6/03644
USPC .......................................... 385/124, 126–128
See application file for complete search history.

(56) References Cited

U.S. PATENT DOCUMENTS

2011/0044596 A1* 2/2011 Zhang et al. .................. 385/124
2012/0230638 A1* 9/2012 Bickham et al. .............. 385/124

FOREIGN PATENT DOCUMENTS

| CN | 101622561 A | 1/2010 |
| CN | 101634728 A | 1/2010 |
| CN | 102778722 A | 11/2012 |
| JP | 2001350052 A | 12/2001 |

OTHER PUBLICATIONS

State Intellectual Property Office of the P.R.C, "First Office Action", China, May 16, 2013.
State Intellectual Property Office of the P.R.C, "Second Office Action", China, Feb. 8, 2014.
State Intellectual Property Office of the P.R.C, "Notice of Grant", China, Aug. 5, 2014.
International Search Report issued by State Intellectual Property Office of the P.R. China dated Aug. 1, 2013 for Application No. PCT/CN2013/074667.

* cited by examiner

*Primary Examiner* — Ryan Lepisto
(74) *Attorney, Agent, or Firm* — Tim Tingkang Xia, Esq.; Locke Lord LLP

(57) ABSTRACT

A graded refractive index bending-resistant multimode optical fiber includes a core layer and claddings. The core layer has a radius in a range of 22.5-27.5 µm; refractive indexes being a gradient-graded refractive index distribution with a distribution exponent $\alpha$ in a range of 1.99-2.06; and a maximum relative refractive index difference (RRID) $\Delta 1\%$ max in a range of 0.9%-1.3%. The claddings has an inner cladding surrounding the core layer, an intermediate cladding surrounding the inner cladding and an outer cladding surrounding the inner cladding. The inner cladding has a radius in a range of 25.5-34.5 µm, and an RRID $\Delta 2\%$ in a range of −0.02%-0.02%. The intermediate cladding is a pure quartz glass layer, and has a radius in a range of 30.5-49.5 µm, and an RRID $\Delta 3\%$ in a range of −0.01%-0.01%. The outer cladding has a radius in a range of 61.5-63.5 µm, and an RRID $\Delta 4\%$ is in a range of −0.20%-0.30%.

16 Claims, 3 Drawing Sheets

GRADED REFRACTIVE INDEX BENDING-RESISTANT MULTIMODE OBTICAL FIBER

CROSS-REFERENCE TO RELATED APPLICATIONS

This application is a continuation application of International Patent Application No. PCT/CN2013/074667, filed Apr. 25, 2013, which itself claims the priority to Chinese Patent Application No. 201210167873.2, filed May 28, 2012 in the State Intellectual Property Office of P.R China, which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to the field of optical communication technologies, and more particular to a graded refractive index multimode optical fiber applied to a 10GBASE-SR and a 10GBASE-SR10 transmission systems; the optical fiber of this invention not only has good bending-resistant character, but also has a high bandwidth and excellent differential mode delay (DMD) performance.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Fiber-optic communications begin with invention and applications of multimode optical fibers. Over the past decades, although singlemode optical fibers have become the main variety demanded in the fiber-optic market, the multimode optical fibers have never been replaced and have maintained a steady growth in market demands. And the reason is that many characteristics of the multimode optical fibers can just meet the use of optical signals, energy transmission, local area network (LAN) data transmission and optical devices. Moreover, the cost of a multimode fiber-optic communication system is far lower than that of a singlemode fiber-optic communication system, which is also one of the reasons why the multimode optical fibers are everlasting.

The 50 um multimode optical fibers are classified, according to the TIA/EIA-492AAA standard, into four types, OM1, OM2, OM3 and OM4. High-bandwidth multimode optical fibers (for example, OM3/OM4) are widely used in short-medium distance fiber-optic network systems due to low system cost. However, when the optical fibers are used indoor or in limited environments, the optical fibers endure a higher bending stress, which will lead to a higher bending loss. Therefore, a heretofore unaddressed need exists in the art to design and develop multimode optical fibers with bending-resistant character, so as to satisfy the need of indoor fiber-optic network construction and device miniaturization.

The existing related studies and patents only give the solutions of optimizing bending performance of the multimode optical fibers, such as Patent ZL201010029031.1 and Patent ZL201110029993.1, but do not give solution of optimizing DMD performance of the high-bandwidth multimode optical fibers (for example, OM3/OM4). In a transmission system of 10G or 100G, DMD is the most critical parameter that decides signal transmission. According to current technical requirements for developing the 10G or 100G transmission systems, an excellent DMD performance becomes more and more important, which decides the signal transmission stability, and directly represents the grade of the multimode optical fiber.

According to the TIA/EIA-492AAA standard, in a 10G network, the transmission distance of the OM3 optical fiber is no less than 300 m, and the transmission distance of the OM4 optical fiber is no less than 550 m; while in a 100G network, the transmission distance of the OM3 optical fiber is no less than 100 m, and the transmission distance of the OM4 optical fiber is no less than 150 m. Similarly, according to the TIA/EIA-492AAA standard, for a multimode optical fiber with the radius of 25 μm, at 850 nm, starting from the fiber core, the measured DMD value at the distance of 5 μm to 18 μm is defined as INNER MASK; and the DMD value at the distance of 0 to 25 μm is defined as OUTER MASK. The distance of 0 to 25 μm is further divided into 7 μm to 13 μm, 9 μm to 15 μm, 11 μm to 17 μm, and 13 μm to 19 μm, and the DMD values at the four distance sections are defined as INTERVAL MASK. Standards TIA/EIA-492AAAC and TIA/EIA-492AAAD respectively specify the DMD performance specification of the OM3 optical fiber and the OM4 optical fiber:

TABLE 1

INNER MASK and OUTER MASK of the OM3 optical fiber @ 850 nm

| DMD Templates | DMD Inner Mask (Unit: ps/m) (Radius 5 to 18 im) | DMD Outer Mask (Unit: ps/m) (Radius 0 to 23 im) |
| --- | --- | --- |
| 1 | ≤0.23 | ≤0.70 |
| 2 | ≤0.24 | ≤0.60 |
| 3 | ≤0.25 | ≤0.50 |
| 4 | ≤0.26 | ≤0.40 |
| 5 | ≤0.27 | ≤0.35 |
| 6 | ≤0.33 | ≤0.33 |

TABLE 2

INTERVAL MASK of the OM3 optical fiber @ 850 nm DMD Interval Mask (Unit: ps/m)

| Radius 7 to 13 μm | ≤0.25 |
| --- | --- |
| Radius 9 to 15 μm | ≤0.25 |
| Radius 11 to 17 μm | ≤0.25 |
| Radius 13 to 19 μm | ≤0.25 |

That is, the DMD values of the INNER MASK and the OUTER MASK of the OM3 optical fiber must satisfy any one of the six templates in Table 1, while according to Table 2, the INTERVAL MASKs of 7 µm to 13 µm, 9 µm to 15 µm, 11 µm to 17 µm, and 13 µm to 19 µm must be less than or equal to 0.25 ps/m.

TABLE 3

INNER MASK and OUTER MASK of the OM4 optical fiber @850 nm

| DMD Templates | DMD Inner Mask (Unit: ps/m) (Radius 5 to 18 µm) | DMD Outer Mask (Unit: ps/m) (Radius 0 to 23 µm) |
| --- | --- | --- |
| 1 | ≤0.10 | ≤0.30 |
| 2 | ≤0.11 | ≤0.17 |
| 3 | ≤0.14 | ≤0.14 |

TABLE 4

INTERVAL MASK of the OM4 optical fiber @ 850 nm DMD Interval Mask (Unit: ps/m)

| Radius 7 to 13 im | ≤0.11 |
| --- | --- |
| Radius 9 to 15 im | ≤0.11 |
| Radius 11 to 17 im | ≤0.11 |
| Radius 13 to 19 im | ≤0.11 |

That is, the DMD values of the INNER MASK and the OUTER MASK of the OM4 optical fiber must satisfy any one of the three templates in Table 3, while according to Table 4, the INTERVAL MASKs of 7 µm to 13 µm, 9 µm to 15 µm, 11 µm to 17 µm, and 13 um to 19 um must be less than or equal to 0.11 ps/m.

SUMMARY OF THE INVENTION

One of the objectives of the present invention is to provide a bending-resistant multimode optical fiber optimized in a window of 850 nm, with an intact refractive index profile structure after fiber drawing, and a high bandwidth and excellent DMD performance.

In order to solve the technical problems in view of the deficiencies in the prior art, the technical solution of the present invention is as follows.

One aspect of the present invention includes a bending-resistant multimode optical fiber with a core layer and claddings. In one embodiment, the radius R1 of the core layer is in a range of about 22.5 µm to about 27.5 µm. The refractive indexes of the core layer are of a gradient-graded refractive index distribution, with a distribution exponent α in a range of about 1.99 to about 2.06. The maximum relative refractive index difference Δ1% max of the core layer is in a range of about 0.9% to about 1.3%. Immediately adjacent to the core layer is an inner cladding having a radius R2 in a range of 25.5 µm to 34.5 µm. The relative refractive index difference Δ2% is in a range of about −0.02% to about 0.02%. Sequentially outwards from the inner cladding layer are an intermediate cladding and an outer cladding. The intermediate cladding is a pure quartz glass layer, with the radius R3 in a range of about 30.5 µm to about 49.5 µm, and the relative refractive index difference Δ3% in a range of about −0.01% to about 0.01%. The radius R4 of the outer cladding is about 62.5±1 um, and the relative refractive index difference Δ4% is in a range of about −0.20% to about 0.30%.

In one embodiment, the core layer and the inner cladding are F—Ge co-doped quartz glass layers, and the relative refractive index difference Δ2% of the inner cladding is less than the refractive index difference Δ1% of the core layer.

In one embodiment, the outer cladding is an F-doped quartz glass layer.

In one embodiment, the distribution exponent α of the core layer is in a range of 2.00 to 2.05, and a higher bandwidth can be obtained in 850 nm wavelength.

In another embodiment, the distribution exponent α of the core layer is in a range of 2.01 to 2.03, and an optimal bandwidth can be obtained in 850 nm wavelength.

In one embodiment, the thickness of a single edge of the inner cladding is in a range of 5 um to 7 um, and better DMD can be obtained.

In one embodiment, the bending-resistant multimode optical fiber prepared according to the present invention satisfies OM3/OM4 DMD characteristic requirements according to the TIA/EIA-492AAA standard.

In one embodiment, the numerical aperture of the optical fiber is in a range of 0.185 to 0.215.

In one embodiment, material composition of the F—Ge co-doped quartz glass layer is $SiO_2$—$GeO_2$-F—Cl; material composition of the F-doped quartz glass layer is $SiO_2$-F—Cl; and the fluorine-containing gas is any one or more of $C_2F_6$, $CF_4$, $SiF_4$ and $SF_6$.

According to the TIA/EIA-455-204 standard, the overfilled launch bandwidth of the optical fiber of the present invention is above 500 MHz·km at the wavelength of 1300 nm; and above 1500 MHz·km and up to 11000 MHz·km at the wavelength of 850 nm.

In one embodiment, at the wavelength of 850 nm, an added loss for two rounds of bending at a bending radius of 7.5 mm is less than 0.2 dB; and an added loss for two rounds of bending at a bending radius of 15 mm is less than 0.1 dB. At the wavelength of 1300 nm, an added loss for two rounds of bending at a bending radius of 7.5 mm is less than 0.5 dB; and an added loss for two rounds of bending at a bending radius of 15 mm is less than 0.3 dB.

DMD is tested according to the method of FOTP-220 (IEC-60793-1-49-2006). The light source used in the test is a high power, narrow spectral width 850 nm laser pulse. The laser pulse is injected into the fiber core of an optical fiber to be tested through a standard singlemode optical fiber. During the test, the position where the laser pulse is injected into the fiber core of the optical fiber to be tested is changed by displacing the singlemode optical fiber, so that the transmission mode of the laser pulse in the optical fiber to be tested is changed, and laser pulse signals output from the optical fiber to be tested in different positions of the singlemode optical fiber are collected and recorded through a detector. Therefore, the delay difference between the different output pulse signals, DMD, obtained is analyzed and calculated.

One aspect of the present invention provides a method for manufacturing a multimode optical fiber including the following steps:

fixing a pure quartz substrate tube on a plasma chemistry vapor deposition (PCVD) lathe for doping and deposition;

adding a fluorine-containing gas into reactive gases of silicon tetrachloride ($SiCl_4$) and oxygen ($O_2$) to introduce fluorine (F) doping and adding germanium tetrachloride ($GeCl_4$) into the reactive gases to introduce germanium (Ge) doping;

ionizing the reactive gases into plasma in the substrate tube with microwave, and finally depositing on the inner wall of the substrate tube in a form of glass;

depositing the inner cladding and the core layer in sequence by altering the flow of the doped gas in the mixed gas according to the doping requirements of the optical waveguide structures;

'collapsing a depositing tube into a solid core rod with a collapsing lathe after depositing, and then preparing a fiber preform using RIT process with fluorine-doped quartz glass as a sleeve; and drawing the preform at a high fiber drawing speed with a low drawing tension to yield a fiber.

The present invention has, among other things, the following beneficial effects. (1). An bending-resistant multimode optical fiber optimized in a transmission window of 850 nm is provided, with a high transmission bandwidth in the window of 850 nm. (2). Through the design of the graded refractive index profile and the F—Ge co-doped cladding structure, additional stress can be endured in the process of drawing a preform into a fiber during optical fiber manufacturing, thereby reducing distortion of the refractive index of the core layer of the optical fiber. In this way, while having a high bandwidth, the multimode optical fiber also has low DMD, which optimizes DMD performance of the optical fiber. (3). The transmission speed of the multimode optical fiber in the window of 850 nm can reach 10 Gbit/s or even 100 Gbit/s, and a good signal stability in a multimode optical fiber transmission system of 10G or 100G can be ensured. (4). The optical fiber has good bending insensitivity, which is adapted to current requirements for the multimode optical fiber in the network transmission and device applications.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
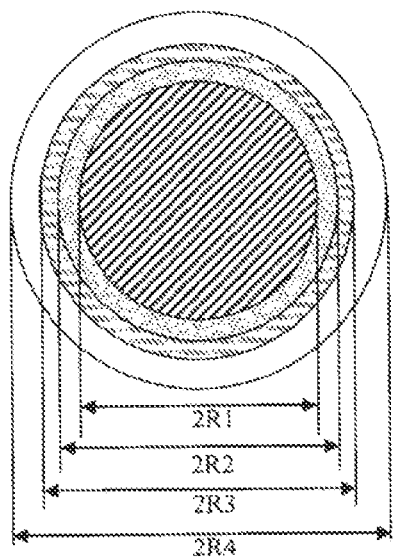
FIG. 1 is a structural diagram of a radial section according to one embodiment of the present invention.
Figure 2:
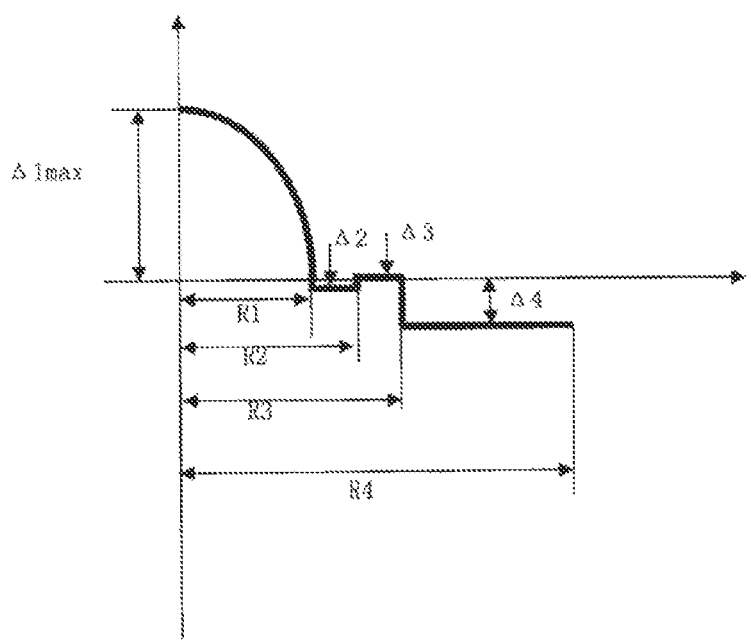
FIG. 2 is a diagram of a refractive index profile according to one embodiment of the present invention.
Figure 3:
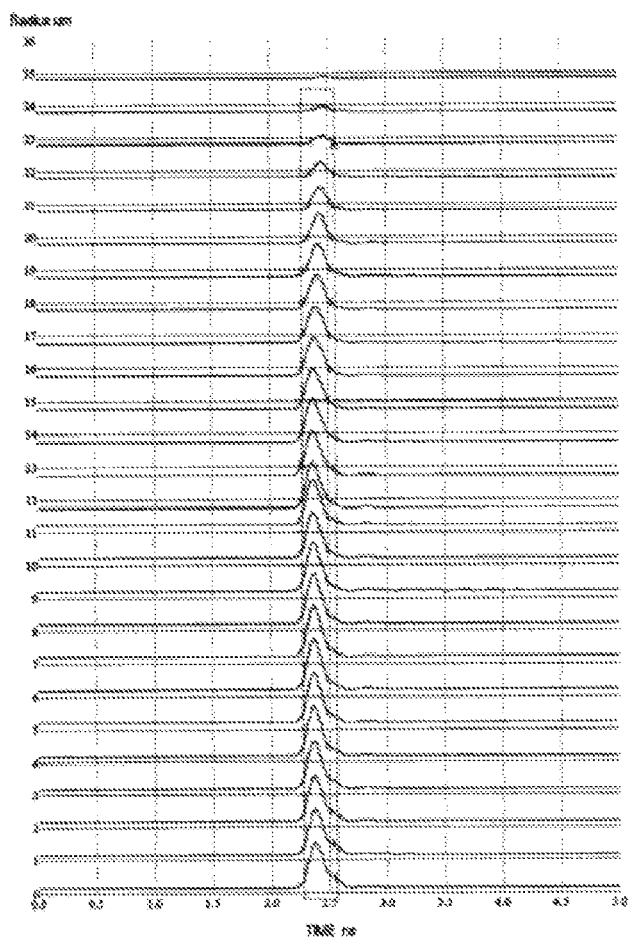
FIG. 3 is a DMD test diagram according to one embodiment of the present invention.
Figure 4:
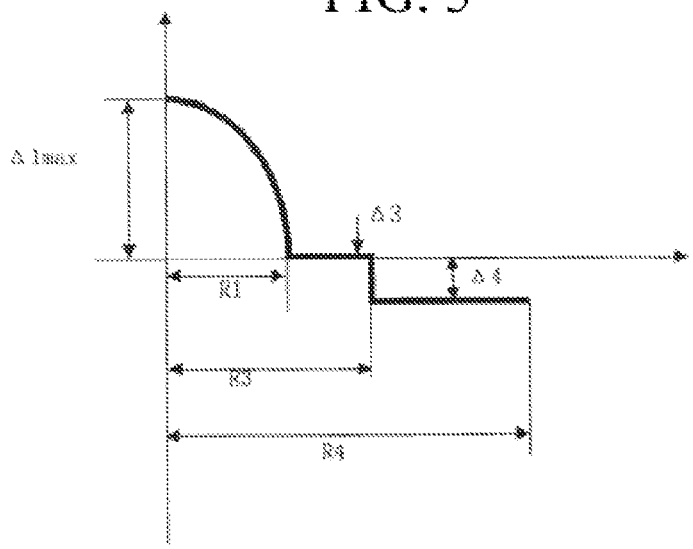
FIG. 4 is a diagram of a refractive index profile of an existing bending-resistant optical fiber of the same type (R2=R3).
Figure 5:
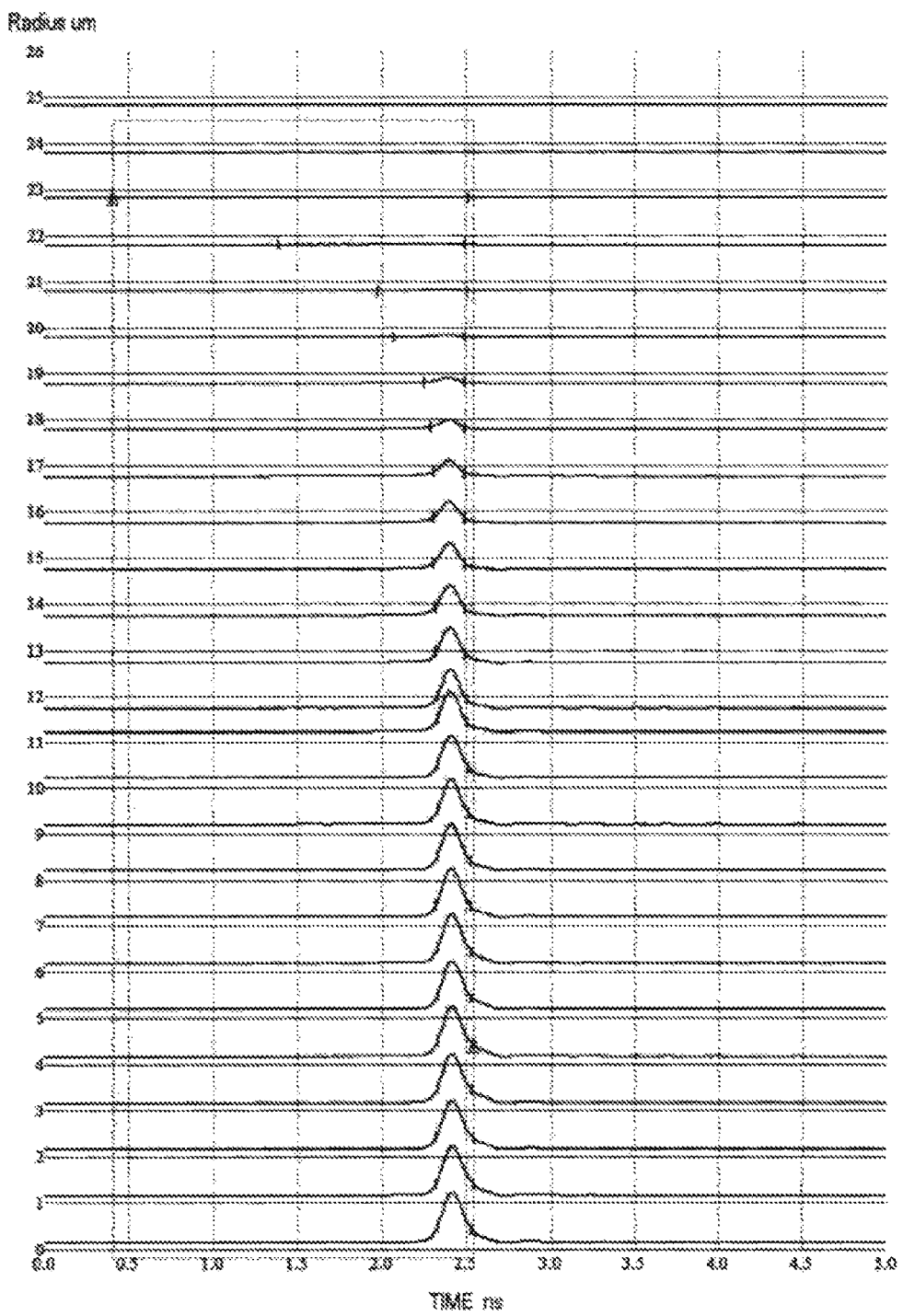
FIG. 5 is a DMD test diagram of an existing bending-resistant optical fiber of the same type.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "quartz substrate tube" refers to a tubular base pipe, whose inner wall bears glassy oxide deposition of a PCVD chemical reaction.

As used herein, the term "sleeve" refers to a quartz glass tube meeting certain geometry and doping requirements.

As used herein, the term "core layer" refers to a central area of a cross section of an optical fiber, which is a major light guiding region of the optical fiber.

As used herein, the term "inner cladding" refers to an annular region in the cross section of the optical fiber which is adjacent to the core layer.

As used herein, the term "intermediate cladding" refers to an annular region in the cross section of the optical fiber which is adjacent to the inner cladding.

As used herein, the term "outer cladding" refers to an annular region in the cross section of the optical fiber which is adjacent to the intermediate cladding.

As used herein, the term "relative refractive index difference" is defined by $$\Delta\% = \left[\frac{(n_i^2 - n_0^2)}{2n_i^2}\right] \times 100\% \approx \frac{n_i - n_0}{n_0} \times 100\%$$

where $n_i$ and $n_0$ are respectively a refractive index of each corresponding portion and a refractive index of pure silica quartz glass at a wavelength of 850 nm. Unless otherwise defined, $n_i$ refers to the maximal refractive index of each corresponding portion in the specification.

As used herein, the term "numerical aperture" is defined by $$NA = n_0 \times (2\Delta)^{1/2}.$$

As used herein, the term "exponential refractive index distribution profile" refers to a refractive index profile which satisfies the following exponential function, which in the form of:

$$n^2(r) = n_1^2\left[1 - 2\Delta\left(\frac{r}{a}\right)^\alpha\right] \quad r < a$$

where $n_1$ represents the refractive index at the axis of an optical fiber; r represents the distance away from the axis of the optical fiber; a represents the radius of the core layer of the optical fiber; $\alpha$ represents the distribution exponent; and $\Delta$ represents the relative refractive index difference of the core layer/the cladding.

As used herein, the term "differential mode delay (DMD) coefficient (ps/m)" is defined by:

$$DMD = [(T_{SLOW} - T_{FAST}) - \Delta T_{REF}]/L$$

where, $\Delta T_{REF}$ represents the time width at 25% of optical pulse intensity of a system light source; $T_{SLOW}$ represents the time of the most trailing optical pulse edge among all output optical pulses in a set position of the incident light relative to the fiber core of an optical fiber to be tested; $T_{FAST}$ represents the time of the most leading optical pulse edge among all output optical pulses in a set position of the incident light relative to the fiber core of the optical fiber to be tested; and L represents the length of the optical fiber to be tested.

The description will be made as to the embodiments of the present invention in conjunction with the accompanying drawings. In accordance with the purposes of this invention, as embodied and broadly described herein, this invention, in one aspect, relates to a graded refractive index bending-resistant multimode optical fiber.

In one embodiment, the multimode optical fiber includes a core layer and claddings, where reference may be made to Table 5 for parameters of the core layer and the claddings including an inner cladding surrounding the core layer, an intermediate cladding surrounding the inner cladding and an outer cladding surrounding the inner cladding. In Table 5, R1 represents the radius of the core layer, R2 represents the radius of the inner cladding, R3 represents the radius of the intermediate cladding, and R4 represents the radius of the outer cladding.

TABLE 5

Parameters of an optical fiber according every embodiment to the invention

| | | 1 | 2 | 3 | 4 | 5 |
|---|---|---|---|---|---|---|
| Exponent α of the core layer | | 1.99 | 2.01 | 2.04 | 2.05 | 2.06 |
| Δ1max (%) | | 1.07 | 0.91 | 1.1 | 1.14 | 1.25 |
| Δ2 (%) | | −0.02 | 0.01 | 0 | 0.01 | 0.01 |
| Δ3 (%) | | −0.001 | 0.001 | 0.001 | 0.001 | 0.002 |
| Δ4 (%) | | −0.22 | −0.25 | −0.3 | −0.26 | −0.29 |
| R1 (μm) | | 25 | 22.7 | 24.2 | 27 | 26.2 |
| R2 (μm) | | 27.2 | 26.9 | 26.2 | 28.5 | 28.2 |
| R3 (μm) | | 32.5 | 33.3 | 35.2 | 34.1 | 33.4 |
| R4 (μm) | | 61.6 | 61.9 | 63.1 | 62.6 | 62.2 |
| Numerical aperture | | 0.199 | 0.185 | 0.205 | 0.211 | 0.214 |
| Overfilled launch bandwidth at 850 nm (MHz-km) | | 1527 | 2537 | 8901 | 3210 | 2201 |
| Overfilled launch bandwidth at 1300 nm (MHz-km) | | 1106 | 765 | 737 | 683 | 681 |
| Bending Added loss at 850 nm (dB/km) | Φ 15 mm × 2 turns | 0.022 | 0.051 | 0.06 | 0.034 | 0.028 |
| | Φ 30 mm × 2 turns | 0.003 | 0.012 | 0.024 | 0.004 | 0.009 |
| Bending Added loss at 1300 nm (dB/km) | Φ 15 mm × 2 turns | 0.045 | 0.087 | 0.046 | 0.035 | 0.061 |
| | Ô 30 mm × 2 turns | 0.007 | 0.005 | 0.004 | 0.009 | 0.009 |

The F—Ge co-doped inner cladding designed according to the present invention can significantly endure additional stress in the process of drawing a preform into a fiber during optical fiber manufacturing, thereby reducing distortion of the refractive index of the core layer of the optical fiber. In this way, the multimode optical fiber manufactured with the design solution of the present invention, has a higher bandwidth and lower DMD; meanwhile, the outer cladding structure with a depressed ring designed according to the present invention makes the optical fiber have a lower macro-bending added loss.

Table 6 shows comparisons between DMD data of an optical fiber according to one embodiment of the present invention and that of an existing optical fiber of the same type.

| | DMD Inner Mask for Radius 5 to 18 im (Unit: ps/m) | DMD Outer Mask for Radius 0 to 23 im (Unit: ps/m) | DMD Interval Mask (Unit: ps/m) | |
|---|---|---|---|---|
| Example of the present invention | 0.05 | 0.08 | Radius 7 to 13 μm | 0.03 |
| | | | Radius 9 to 15 μm | 0.04 |
| | | | Radius 11 o 17 μm | 0.05 |
| | | | Radius 13 to 19 μm | 0.05 |
| Example of the existing optical fiber | 0.17 | 0.82 | Radius 7 to 13 μm | 0.10 |
| | | | Radius 9 to 15 μm | 0.09 |
| | | | Radius 11 to 17 μm | 0.07 |
| | | | Radius 13 to 19 μm | 0.12 |

The DMD data given in Table 6 strongly indicates that the present invention can effectively reduce DMD of the bending-resistant multimode optical fiber, thereby ensuring that the optical fiber satisfies the requirements for DMD characters according to TIA/EIA-492AAA standard.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A graded refractive index bending-resistant multimode optical fiber, comprising:
   a core layer; and claddings surrounding the core layer, wherein the core layer has a radius in a range of 22.5 μm to 27.5 μm; refractive indexes being of a gradient-graded refractive index distribution with a distribution exponent α in a range of 1.99 to 2.06; and a maximum relative refractive index difference Δ1% max in a range of 1.07% to 1.3%;
   wherein the claddings surrounding the core layer comprises an inner cladding surrounding the core layer, an intermediate cladding surrounding the inner cladding and an outer cladding surrounding the intermediate cladding;
   wherein the inner cladding has a radius in a range of 25.5 μm to 34.5 μm, and a relative refractive index difference Δ2% in a range of −0.02% to 0.02%;
   wherein the intermediate cladding is a pure quartz glass layer, and has a radius in a range of 30.5 μm to 49.5 μm, and a relative refractive index difference Δ3% in a range of −0.01% to 0.01%; and
   wherein the outer cladding has a radius in arrange of 61.5 μm to 63.5 μm, and a relative refractive index difference Δ4% is in a range of −0.20% to 0.30%.

2. The graded refractive index bending-resistant multimode optical fiber according to claim 1, wherein the outer cladding is an F-doped quartz glass layer.

3. The graded refractive index bending-resistant multimode optical fiber according to claim 1, wherein a distribution exponent α of the core layer is in a range of 2.00 to 2.05.

4. The graded refractive index bending-resistant multimode optical fiber according to claim 3, wherein the distribution exponent α of the core layer is in a range of 2.01 to 2.03.

5. The graded refractive index bending-resistant multimode optical fiber according to claim 1, wherein a thickness of a single edge of the inner cladding is in a range of 5 μm to 7 μm.

6. The graded refractive index bending-resistant multimode optical fiber according to claim 1, having a numerical aperture in a range of 0.185 to 0.215.

7. The graded refractive index bending-resistant multimode optical fiber according to claim 1, having an overfilled launch bandwidth above 500 MHz-km at the wavelength of 1300 nm; and above 1500 MHz-km at the wavelength of 850 nm.

8. The graded refractive index bending-resistant multimode optical fiber according to claim 1, wherein, at the wavelength of 850 nm, an added loss for two rounds of bending at a bending radius of 7.5 mm is less than 0.2 dB; and an added loss for two rounds of bending at a bending radius of 15 mm is less than 0.1 dB. At the wavelength of 1300 nm, an added loss for two rounds of bending at a bending radius of 7.5 mm is less than 0.5 dB; and an added loss for two rounds of bending at a bending radius of 15 mm is less than 0.3 dB.

9. The graded refractive index bending-resistant multimode optical fiber according to claim 1, wherein the core layer and the inner cladding are F-Ge co-doped quartz glass layers, and wherein the relative refractive index difference Δ2% of the inner cladding is less than the refractive index difference Δ1% of the core layer.

10. The graded refractive index bending-resistant multimode optical fiber according to claim 9, wherein the outer cladding is an F-doped quartz glass layer.

11. The graded refractive index bending-resistant multimode optical fiber according to claim 9, wherein a distribution exponent α of the core layer is in a range of 2.00 to 2.05.

12. The graded refractive index bending-resistant multimode optical fiber according to claim 11, wherein the distribution exponent α of the core layer is in a range of 2.01 to 2.03.

13. The graded refractive index bending-resistant multimode optical fiber according to claim 9, wherein a thickness of a single edge of the inner cladding is in a range of 5 μm to 7 μm.

14. The graded refractive index bending-resistant multimode optical fiber according to claim 9, having a numerical aperture in a range of 0.185 to 0.215.

15. The graded refractive index bending-resistant multimode optical fiber according to claim 9, having an overfilled launch bandwidth above 500 MHz-km at the wavelength of 1300 nm; and above 1500 MHz-km at the wavelength of 850 nm.

16. The graded refractive index bending-resistant multi-mode optical fiber according to claim 9, wherein, at the wavelength of 850 nm, an added loss for two rounds of bending at a bending radius of 7.5 mm is less than 0.2 dB; and an added loss for two rounds of bending at a bending radius of 15 mm is less than 0.1 dB, and at the wavelength of 1300 nm, an added loss for two rounds of bending at a bending radius of 7.5 mm is less than 0.5 dB; and an added loss for two rounds of bending at a bending radius of 15 mm is less than 0.3dB.

* * * * *

UNITED STATES PATENT AND TRADEMARK OFFICE
CERTIFICATE OF CORRECTION

| | | |
|---|---|---|
| PATENT NO. | : 9,170,369 B2 | Page 1 of 1 |
| APPLICATION NO. | : 14/548047 | |
| DATED | : October 27, 2015 | |
| INVENTOR(S) | : Song Wang | |

It is certified that error appears in the above-identified patent and that said Letters Patent is hereby corrected as shown below:

Title Page, Item (54): "GRADED REFRACTIVE INDEX BENDING-RESISTANT MULTIMODE OBTICAL FIBER" should appear as follows:

-- GRADED REFRACTIVE INDEX BENDING-RESISTANT MULTIMODE OPTICAL FIBER --

Signed and Sealed this
Ninth Day of August, 2016

Michelle K. Lee
*Director of the United States Patent and Trademark Office*